United States Patent [19]

Cooper et al.

[11] Patent Number: 5,039,351
[45] Date of Patent: Aug. 13, 1991

[54] HIGH PERFORMANCE THIN FILM ALKALI METAL THERMOELECTRIC DEVICE

[75] Inventors: Martin H. Cooper, Churchill Boro; Robert K. Sievers, Irwin, both of Pa.

[73] Assignee: Westinghouse Electric Corp., Pittsburgh, Pa.

[21] Appl. No.: 644,404

[22] Filed: Jan. 22, 1991

Related U.S. Application Data

[63] Continuation of Ser. No. 7/437,878, Nov. 17, 1989, abandoned.

[51] Int. Cl.⁵ ............ H01L 37/00; H01M 6/36
[52] U.S. Cl. ................... 136/202; 429/11; 429/104; 429/112; 429/120; 136/200; 136/205; 136/240
[58] Field of Search ........... 136/202, 200, 205, 236.1, 136/230, 240; 429/5, 11, 50, 104, 112, 120

[56] References Cited

U.S. PATENT DOCUMENTS

| | | | |
|---|---|---|---|
| 4,042,757 | 8/1977 | Jones | 429/104 |
| 4,049,877 | 9/1977 | Saillant et al. | 429/11 |
| 4,175,164 | 11/1979 | Cole | 429/11 |
| 4,216,273 | 8/1980 | Cadart et al. | 429/50 |
| 4,220,692 | 9/1980 | Hunt | 429/104 |
| 4,244,986 | 1/1981 | Paruso et al. | 427/126.4 |
| 4,505,991 | 3/1985 | Weber | 429/11 |
| 4,808,240 | 2/1989 | Sievers | 136/202 |
| 4,808,877 | 2/1989 | Sievers et al. | 313/25 |
| 4,857,421 | 8/1989 | Ernst | 429/104 |
| 4,868,072 | 9/1989 | Abbin et al. | 429/11 |

FOREIGN PATENT DOCUMENTS 0097736 8/1979 Japan .................. 429/102

Primary Examiner—Brooks H. Hunt
Assistant Examiner—Chrisman D. Carroll
Attorney, Agent, or Firm—Fred J. Baehr, Jr.

[57] ABSTRACT

An alkali metal thermoelectric conversion device formed from a porous tube or plate coated with a thin film of beta-alumina, the porous tube or plate is sintered metal or metal alloy having a coefficient of thermal expansion which approaches that of the beta-alumina to form a mechanically stable device with high electrical output.

15 Claims, 2 Drawing Sheets

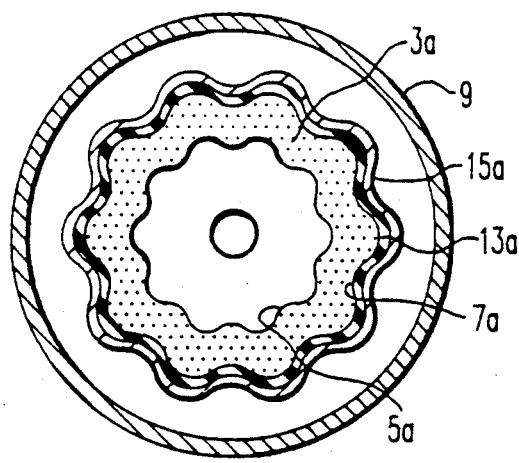
FIG. 3
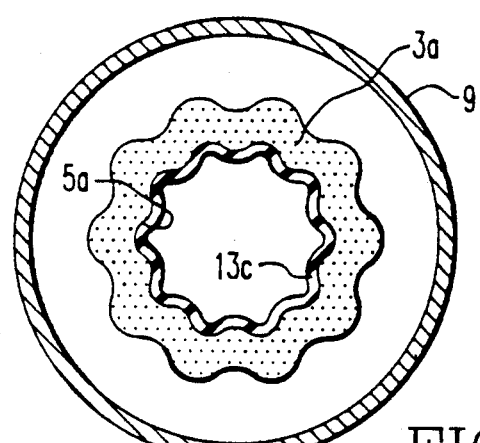
FIG. 4
FIG. 5
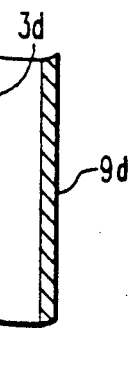
FIG. 6
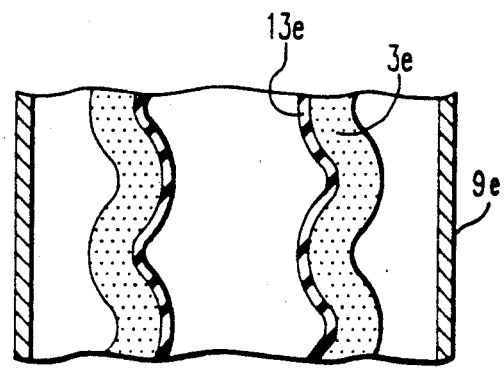
FIG. 7

HIGH PERFORMANCE THIN FILM ALKALI METAL THERMOELECTRIC DEVICE

This application is a continuation of application Ser. No. 07/437,878 filed Nov. 17, 1989, and now abandoned.

BACKGROUND OF THE INVENTION

The invention relates to an alkali metal thermoelectric conversion (AMTEC) device and more particularly to one with improved mechanical strength and higher performance.

Alkali metal thermoelectric conversion devices convert heat directly to electrical energy, using a beta-alumina solid electrolyte member that will conduct sodium ions, but not electrons. This electrolyte member forms a boundary between high and low pressure sodium filled regions. The temperature in the region of the electrolyte is elevated so that the corresponding saturation pressure is greater than the low pressure region. Under these conditions a chemical potential is developed across the electrolyte that drives sodium ions from the high to the low pressure side along ion conduction planes in the crystal lattice. A charge or potential difference is thereby developed across the electrolyte by the positive ions emerging on the low pressure side and excess electrons, released when the neutral sodium ionized, accumulating on the high pressure side.

Electronic conduction layers, that allow the passage of sodium to the surface of the electrolyte, are located on both sides of the electrolyte. These conduction layers are connected through a load and allow the excess electrons accumulating on the high pressure side to move to the low pressure side where they recombine with the excess sodium ions, and in the process perform electrical work on the load. The sodium ion that has passed through the electrolyte and recombined with an electron on the low pressure side, evaporates from the electrolyte surface and is then condensed, collected and pumped back to the high pressure side. Thermal energy is added to the system to replace the generated electrical energy and any heat rejection from the device. U.S. Pat. No. 4,808,240 granted to one of the inventors describes a stacked vapor fed AMTEC module that operates on the principle described herebefore. The beta-alumina used in such devices have mechanical properties susceptible to failure from thermal and mechanical stresses.

SUMMARY OF THE INVENTION

Among the objects of the invention is the provision of an alkali metal thermoelectric conversion device in which the electrolyte's ability to withstand mechanical and thermally induced loads is substantially improved thereby substantially increasing its reliability and making it more economical to produce and maintain.

In general, an alkali metal thermoelectric conversion device, when made in accordance with this invention, comprises a porous member generally having two main surfaces one of which is coated with an ionic conducting coating; high pressure alkali metal disposed on one side of the porous member and lower pressure alkali metal disposed on the other side of the porous member, whereby alkali metal ions, but not electrons pass through the ionic conducting coating and freed electrons pass through an external circuit and recombine with alkali metal ions on the low pressure side of the ionic conducting coating to produce useful electrical energy in the external circuit when heat energy is added to the device.

BRIEF DESCRIPTION OF THE DRAWINGS

The invention as set forth in the claims will become more apparent by reading the following detailed description in conjunction with the accompanying drawings, wherein like reference numerals refer to like parts through the drawings and in which:

FIG. 3 is a sectional view of an alternative alkali metal thermoelectric conversion device;

FIG. 4 is a sectional view showing an alternative tubular embodiment;

FIG. 5 is a sectional view showing an additional tubular embodiment;

FIG. 6 is a partial sectional view showing an embodiment utilizing flat plates; and FIG. 7 is a partial section view showing an embodiment utilizing plates with extended surfaces.

DESCRIPTION OF THE PREFERRED EMBODIMENT

Figure 1:
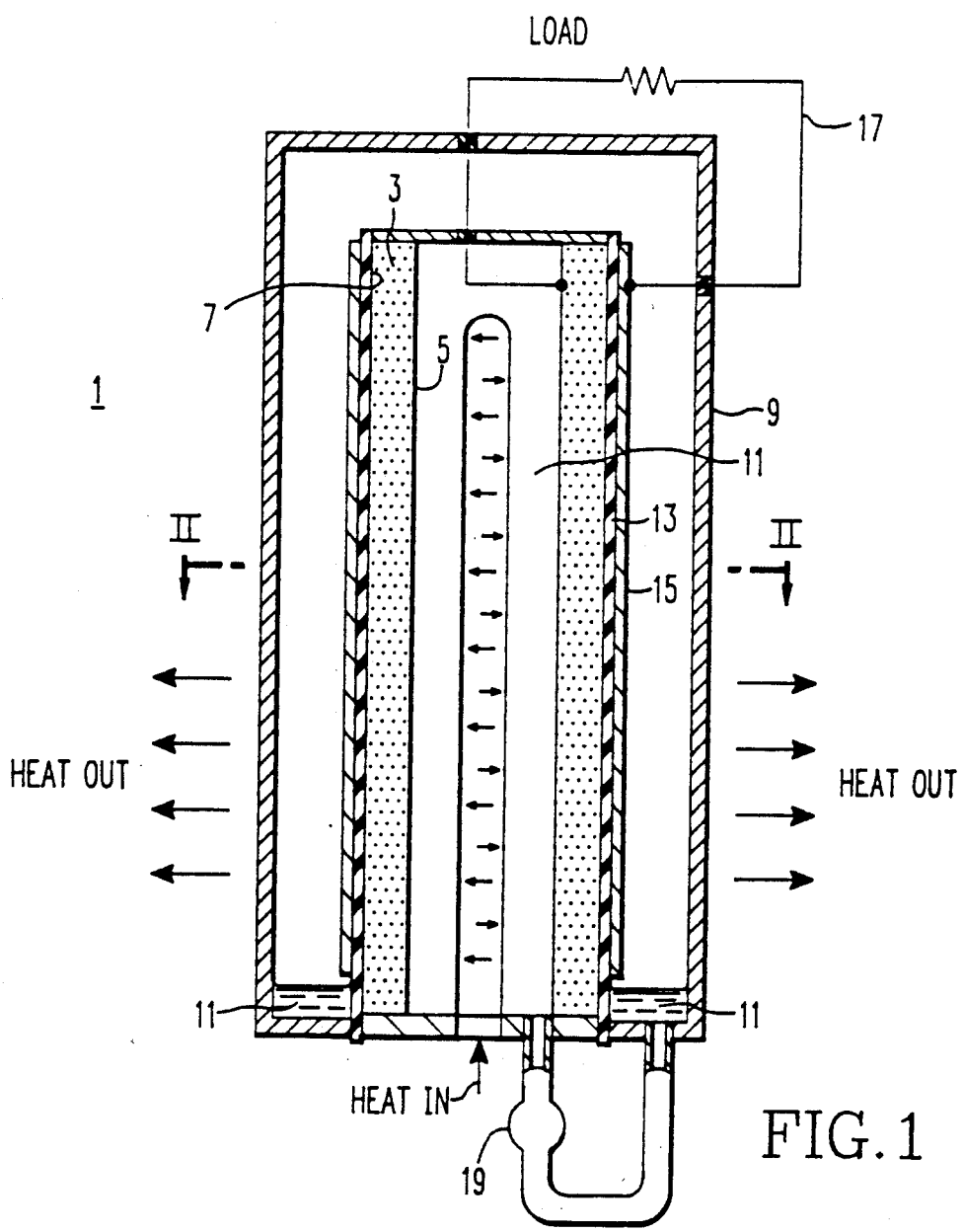
FIG. 1 is a schematic sectional view of an alkali metal thermoelectric conversion device made in accordance with this invention.
Figure 2:
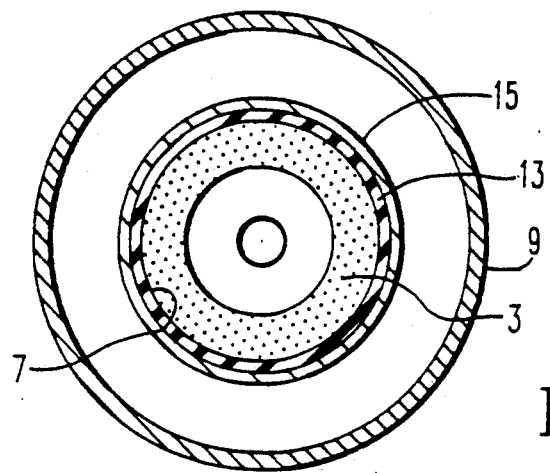
FIG. 2 is a sectional view taken on line II—II of FIG. 1 showing a tubular embodiment.

Referring now to the drawings in detail and in particular to FIGS. 1 and 2 there is shown an alkali metal thermoelectric conversion device 1 having a tubular porous structure 3 with two major surfaces 5 and 7 disposed in a containment vessel 9. The porous structure 3 is made of a material such as niobium, which has more strength than the beta-alumina electrolyte previously used. A thin film of beta-alumina 13 coats one of the major surfaces, the outer surface 5 of the porous structure 3 and a porous thin film conductor 15 is disposed over the beta-alumina coating 13 to form an electrode and the porous structure 3 or enclosed alkali liquid metal forms a second electrode. The beta-alumina coating 13 divides the vessel 9 into a high pressure portion and a low pressure portion each of which contains an alkali liquid metal 11 such as sodium. The electrodes are electrically connected to an external circuit 17. An electromagnetic pump or other pumping means 19 transfers liquid metal from the low pressure portion to the high pressure portion. The porous tube 3 provides the mechanical strength necessary for applications where mechanical shock loads are encountered.

High pressure high temperature liquid sodium or other liquid alkali metal fills the inside of the porous tubular structure 3 and passes therethrough. The beta-alumina coating 13 is impervious to sodium and electrons, but not to sodium ions which pass therethrough. The external circuit 17 electrically connects the tubular structure 3 or the liquid sodium serving as one electrode to the electrode formed by the porous coating 15 on the beta-alumina 13. Excess electrons released by sodium ionization on the high pressure side of the beta-alumina coating 13 move through the external circuit 17, when work is done on the load, and recombine with sodium ions that have passed through the beta-alumina 13 to the low pressure side. The recombination takes place at the interface between the beta-alumina 13 and the porous coating 15. The sodium vaporizes due to the lower pressure in the low pressure portion and the vapor flows to the vessel walls 9, which are cooled to a temperature less than that of the beta-alumina 13, and condenses. The condensed sodium is pumped to the high pressure portion forming a closed cycle which converts heat directly added to the device into electrical energy.

FIG. 3 shows a alkali metal thermoelectric conversion device similar to the one shown in FIGS. 1 and 2 except that it has a tubular structure 3a having an extended surface, which is coated on its outer surface 7a with a thin film of beta-alumina 13a. A thin coating of a porous conductive material 15a overlays the beta-alumina coating 13a serving as an electrode. This embodiment increases the surface area of the beta-alumina coating 13a without increasing the overall size of the alkali metal thermoelectric conversion device to produce more electrical energy.

In FIG. 4 a beta-alumina coating 13b is disposed on the inner surface 7 of the porous structure 3 rather than on the outer surface as shown in FIGS. 1 and 2. An electrode 15b or liquid sodium is disposed on the inside of the beta-alumina 13b. The high pressure region is enclosed by the beta-alumina 13b. The external circuit 17 is connected between the porous structure 3 and the electrode 15b or liquid sodium disposed on the inside of the beta-alumina 13b. The beta-alumina 13b in this configuration is more resistive of the outward radial pressure loads.

The embodiment shown in FIG. 5, like FIG. 3 has the same porous tubular structure 3a with an extended surface, however, a thin film of beta alumina 13c is disposed on an inside surface 5a of the extended surface sintered tube 3a similar to FIG. 4 and operates essentially the same except the extended surface produces more electrical energy.

FIG. 6 shows a pair of porous structures 3d formed as flat plates coated on one side 5d with a thin film of beta-alumina 13d. The flat plates are inexpensive to manufacture, but because of the differential pressure across them, they must be of limited size or incorporate cross ties or bracing, if large.

As shown in FIG. 7 a pair of extended surface, porous structures 3e are utilized in place of the flat sintered metal plates shown in FIG. 6. The extended surface is formed by corrugations in sintered metal plates 3e and are coated with a thin film of beta-alumina 13e. The advantages of the corrugations are two fold: they provide more surface area in essentially the same space and add stiffness or greater section modules, to provide more surface area without cross ties or other bracing.

The porous structures 3 and 3a–3e is made from some combination of molybdenum, niobium, rhodium, tantalum, tungsten, alumina or any other refractory material or metal alloy having a coefficient of thermal expansion which approaches that of beta-alumina. These materials provide high strength and the thin film beta-alumina and porosity of the porous structure facilitate transport of sodium ions through the beta-alumina. The ionic resistance of the thin film of beta-alumina is lower than the resistance of the thicker beta-alumina used as a structural member, which results in higher specific power densities, watts per square centimeter compared with the prior art alkali metal thermo-electric conversion devices.

While the preferred embodiments described herein set forth the best mode to practice this invention presently contemplated by the inventor, numerous modifications and adaptations of this invention will be apparent to others skilled in the art. Therefore, the embodiments are to be considered as illustrative and exemplary and it is understood that numerous modifications and adaptations of the invention as described in the claims will be apparent to those skilled in the art. Thus, the claims are intended to cover such modifications and adaptations as they are considered to be within the spirit and scope of this invention.

What is claimed is:

1. An alkali metal thermoelectric conversion device comprising a porous sintered metal support structure with the ability to withstand mechanically and thermally induced loads having two main surfaces one of which is coated with a thin film of an ionic conducting coating; high pressure alkali metal disposed on one side of the porous structure and lower pressure alkali metal disposed on the other side of the porous structure, whereby alkali metal ions, but not electrons, pass through the thin film of ionic conducting coating and freed electrons pass through an external circuit and recombine with alkali metal ions on the low pressure side of the thin film of ionic conducting coating to produce useful electrical energy in the external circuit at high specific power densities when heat is added to the device.

2. The device of claim 1, wherein the ionic conductor is beta-alumina.

3. The device of claim 2, wherein the porous structure is made from some combination of sintered molybdenum, niobium, rhodium, tantalum, tungsten or any other refractory metal or metal alloy having a coefficient of thermal expansion which approaches that of beta-alumina.

4. The device of claim 1, wherein the porous structure is tubular.

5. The device of claim 4, wherein the ionic conductor coating is on the outer surface of the porous tubular structure.

6. The device of claim 5, and further comprising a porous electrically conductive coating disposed over the ionic conducting coating.

7. The device of claim 6, wherein the ionic conductive coating is beta-alumina and the porous electrically conductive coating is a metal or metal alloy having a coefficient of thermal expansion which approaches that of the beta-alumina.

8. The device of claim 1, and further comprising means for transferring alkali metal from the low pressure portion to the high pressure portion.

9. The device of claim 4, wherein the ionic conducting coating is on the inside surface of the porous tubular structure.

10. The device of claim 9, wherein the ionic conducting coating is beta-alumina.

11. The device of claim 10, wherein the porous tubular structure has an extended surface.

12. The device of claim 11, wherein the extended surface is formed by corrugations in the porous tubular structure.

13. An alkali metal thermoelectric conversion device comprising a porous sintered metal structure with the ability to withstand mechanically and thermally induced loads which is pervious to liquid alkali metal and having generally two major surfaces one of which is coated with a thin film of beta-alumina which will pas alkali metal ions but not electrons; the beta-alumina being disposed to form a high pressure alkali metal portion and a low pressure alkali metal portion; means for transferring liquid alkali metal from the low pressure to the high pressure portion; means for adding heat to the high pressure portion and means for removing heat from the low pressure portion; electrical connections on both sides of the beta-alumina electrically connected to an external circuit and load to supply electrons that recombine with the alkali metal ions that pass through the beta-alumina to reform the alkali metal and produce an electrical current in the external circuit at high specific power densities.

14. The device of claim 13, wherein the porous structure is a plate having one of its major surfaces coated with a thin film of beta-alumina.

15. The device of claim 14, wherein the plate having extended surfaces is corrugated.

* * * * *